US006823852B2

(12) United States Patent
Collier, Jr.

(10) Patent No.: US 6,823,852 B2
(45) Date of Patent: Nov. 30, 2004

(54) LOW-EMISSION INTERNAL COMBUSTION ENGINE

(75) Inventor: R. Kirk Collier, Jr., Reno, NV (US)

(73) Assignee: Collier Technologies, LLC, Reno, NV (US)

(*) Notice: Subject to any disclaimer, the term of this patent is extended or adjusted under 35 U.S.C. 154(b) by 0 days.

(21) Appl. No.: 10/369,124

(22) Filed: Feb. 19, 2003

(65) Prior Publication Data

US 2003/0209211 A1 Nov. 13, 2003

Related U.S. Application Data

(60) Provisional application No. 60/357,941, filed on Feb. 19, 2002.

(51) Int. Cl.$^7$ ................................................. F02B 43/00
(52) U.S. Cl. ..................... 123/527; 123/193.1; 123/1 A; 123/DIG. 12
(58) Field of Search ................................. 123/1 A, 527, 123/193.1, DIG. 12

(56) References Cited

U.S. PATENT DOCUMENTS

| | | | | |
|---|---|---|---|---|
| 1,684,407 | A | * | 9/1928 | Nibbs ........................ 123/61 V |
| 5,660,602 | A | | 8/1997 | Collier, Jr. et al. |
| 5,666,923 | A | | 9/1997 | Collier, Jr. et al. |
| 5,787,864 | A | | 8/1998 | Collier, Jr. et al. |
| 5,947,063 | A | | 9/1999 | Smith et al. |
| 6,397,790 | B1 | | 6/2002 | Collier, Jr. |
| 6,405,720 | B1 | | 6/2002 | Collier, Jr. |
| 6,508,209 | B1 | | 1/2003 | Collier, Jr. |

OTHER PUBLICATIONS

Endres, H. et al., "Influence of Swirl and Tumble on Economy and Emissions of Multi Valve SI Engines," *SAE Technical Paper Series*, Feb. 24–28, 1992, 12 pages, No. 920516, SAE International, Warrendale, PA.

Sakurai, T., et al., "Basic Research on Combustion Chambers for Lean Burn Gas Engines," *SAE Technical Paper Series*, Oct. 18–21, 1993, 11 pages, No. 932710, SAE International, Warrendale, PA.

Heywood, J.B., "Charge Motion Within the Cylinder," *Internal Combustion Engine Fundamentals*, ©1998, Sections 8.3.1–8.3.2, pp. 343–347, ISBN 0–07–028637–X, McGraw–Hill.

Mori, K., et al., "New Quiescent Combustion System for Heavy–Duty Diesel Engines to Overcome Exhaust Emissions and Fuel Consumption Trade–Off," *SAE Technical Paper Series*, Jun. 19–22, 2000, 13 pages, No. 2000–01–1811, CEC and SAE International, Warrendale, PA.

Internet papers: Energy Information Administration, "Reducing Nitrogen Oxide Emissions: 1996 Compliance with Title IV Limits," 15 pages, http://www.eia.doe.gov/cneaf/electricity/nox_emissions/contents.html.

* cited by examiner

Primary Examiner—Andrew M. Dolinar
Assistant Examiner—Katrina B. Harris
(74) Attorney, Agent, or Firm—Christie, Parker & Hale, LLP

(57) ABSTRACT

A method of operating an internal combustion engine under high charge dilution conditions using a hydrogen-rich fuel is disclosed. The high charge dilution conditions are attained by diluting the hydrogen-rich fuel with gases such as excess air or recycled exhaust gas. The mixture to be charged to the combustion chamber is thoroughly mixed before it is introduced into the combustion chamber while the combustion chamber maintains a substantially quiescent state such that the charge mixture is introduced with an angular momentum lower than that of a typical low emission engine. The result is an internal combustion engine with both high efficiency and low emissions, particularly, low NOx emissions.

20 Claims, 3 Drawing Sheets

(a)　　　　　　　　　　(b)
Flat Top　　　　　　　Dish Top

LOW-EMISSION INTERNAL COMBUSTION ENGINE

CROSS-REFERENCE TO RELATED APPLICATION

This application claims priority to Provisional Application No. 60/357,941, filed Feb. 19, 2002.

FIELD OF THE INVENTION

This invention relates to gaseous fuel powered internal combustion engines, and more particularly, it relates to a method of operating an internal combustion engine using a hydrogen-rich fuel to produce exhaust gas having near-zero NOx.

BACKGROUND

Internal combustion engines are commonly used in motor vehicles as well as for other purposes such as power generation. In the last few decades, federal and state regulatory agencies have encouraged engine manufacturers to produce cleaner burning engines. Reduced vehicle emissions have been achieved largely due to modifications in the engine design, with some modifications to the traditional hydrocarbon fuels. More recently, the federal and state agencies have been encouraging the use of alternative fuels, particularly, gaseous fuels such as hydrogen, natural gas, propane and butane. In general, such gaseous fuels tend to burn cleaner than conventional hydrocarbon fuels. Hydrogen has generally been considered a particularly clean fuel since theoretically, its only combustion product is water vapor. However, the combustion of such fuels can still tend to produce a significant amount of emissions of oxides of nitrogen (NOx). In particular, because hydrogen has a high flame temperature, and because NOx tend to form at high temperatures hydrogen-rich fuels tend to burn hotter, producing high levels of NOx emissions.

In order to reduce NOx emissions, some engine manufacturers have designed engines in which additional gases are introduced into the fuel stream to dilute the fuel charged into the combustion chamber. Such dilution tends to reduce the flame temperature, thereby reducing NOx emissions. Common methods of diluting the charge include the addition of excess air to the air-fuel mixture charged to the combustion chamber to operate under "lean-burn" conditions, or the use of exhaust gas recirculation (EGR). The term "excess air" is intended to mean an amount of air in excess of the stoichiometric amount necessary to support complete combustion of the fuel. The use of charge dilution results in an increase in the heat capacity of the gases used in the combustion process. The increase in heat capacity in turn reduces the peak temperature of the combustion process. By sufficiently reducing the peak temperature, NOx emissions can be significantly reduced.

One problem with operating an engine at high charge dilution is that for some fuels, the charge mixture can become too lean to support complete combustion, resulting in a "misfire" condition. Misfire not only results in a severe drop in engine efficiency, but also results in high emissions of unburned hydrocarbons in the engine exhaust. Consequently, while high levels of charge dilution are desired to produce low NOx emissions, near-zero NOx emissions are difficult to achieve because of misfire.

Some engine designers have overcome such limits on the levels of charge dilution possible by adding a fuel such as hydrogen to the fuel charge. Hydrogen has range of flammability that is wider than the flammability ranges of most hydrocarbons, and therefore, the addition of hydrogen permits an engine to operate at high levels of charge dilution without causing engine misfire.

Another factor that must be considered when designing an engine to operate at high levels of charge dilution is that good mixing of the mixture charged to the combustion chamber is critical for both efficient combustion and low emissions. Without good mixing, "hot spots" can develop in certain areas within the combustion chamber causing an increase in NOx emissions. The most common means of achieving good mixing is through engine design whereby high levels of internal angular momentum are imparted to the charge mixture as it is introduced into the combustion chamber. Such high levels of angular momentum generally promote turbulent mixing of the air-fuel mixture, thereby promoting faster combustion flame speeds in highly diluted mixtures. For liquid fuels such as gasoline, the high angular momentum further promotes the vaporization of the fuel.

Currently there are two commonly used methods for generating high angular momentum in the charge mixture. The first method is to configure the engine intake ports and/or the intake valves relative to the engine cylinder so that the charge mixture circulates within the cylinder. The object of this method is to sustain an overall circular motion within the cylinder until the piston reaches the bottom of its travel during the intake stroke. As the cylinder moves upward in the cylinder on the compression stroke, the remaining circular motion of the charge mixture is amplified by the decreasing volume in the cylinder. The resulting circular or vortex motion of the charge mixture at the point of initial combustion can be quite high causing excellent mixing for a charge mixture composed of hydrocarbons, air and recycle gases. In one type of intake port design, the intake port has a shallow angle of flow relative to the valve face in order to generate a significant flow velocity in a plane perpendicular to the cylinder centerline. According to another intake port design, a helical port is used to impart a vortex motion to the charge before it reaches the intake valve. Intake valves can also be designed with shrouds to cause unequal flow about the intake valve to generate a vortex flow within the engine cylinder. Furthermore, multiple intake valves can be used whereby the valves introduce the charge mixture into the combustion chamber in different directions to promote vortex flow.

The second method for generating high angular momentum in the charge mixture is through combustion chamber design. Rapidly moving circular vortices in the charge mixture can be promoted by designing the shape of the combustion chamber to cause high angular momentum, especially during the compression cycle. This is commonly achieved by the piston crown design. Commonly used piston crowns designed to promote vortex flow include the "bathtub" design, "bowl-in-piston" design, "nebula" design, "reentrant" design, and the "TG" design.

Cylinder head designs can also be used to modify the shape of the combustion chamber, thereby contributing to high angular momentum within the cylinder. For example, cylinder heads can be designed with shrouds similar to intake valve shrouds, or with a "chamber-in-head" design, either of which will cause unequal flow about the intake valve, resulting in the generation of vortex flow within the combustion chamber. Any of these designs, or combinations of the designs can be used to promote vortex flow within the combustion chamber.

Regardless of whether either of these two methods or some other method is used to achieve high angular momentum within the combustion chamber, two types of angular momentum are generally recognized. The first is where the circular motion within the combustion chamber is generally about an axis defined by the centerline of the engine cylinder. This type of angular momentum is called "swirl." The second is where the circular motion within the combustion chamber is generally about an axis perpendicular to the axis defined by the centerline of the engine cylinder. This type of angular momentum is called "tumble."

For lean-burn engines operating on natural gas and other gaseous hydrocarbons, maintaining good mixing of the charge mixture such as by using a combustion chamber with high levels of swirl and tumble is critical for preventing incomplete combustion and maintaining low NOx emissions.

SUMMARY OF THE INVENTION

While commonly used methods of promoting swirl and tumble within a combustion chamber have proven effective in producing low-emission engines that run on hydrocarbon fuels, for an engine running on a hydrogen-rich fuel, it has been discovered by the inventor that causing high levels of swirl and tumble can lead to higher emissions and poorer engine performance than would otherwise be expected. It is theorized that where a charge mixture containing a hydrogen-rich fuel is subjected to high levels of angular momentum, rather than promoting good mixing of the charge mixture, the resulting centrifugal forces actually cause separation of the charge mixture.

For a lean-burn engine operating on a hydrogen-rich fuel, the major constituents of the charge mixture will be hydrogen, methane, nitrogen, oxygen, carbon dioxide and water vapor. Given that the molecular weight of hydrogen is approximately 2, methane is approximately 16, nitrogen is approximately 28, oxygen is approximately 32, carbon dioxide is approximately 44 and water is approximately 18, hydrogen is by far the lightest constituent in the charge mixture. Consequently, it is believed that any angular momentum of the charge mixture will produce a centrifuge effect by which the heavier components are pushed to the outer edge of the vortex which generally corresponds with the walls of the combustion chamber while the hydrogen remains concentrated near the center of the vortex, typically at the center of the combustion chamber near the spark plug. The resulting areas of high concentration of hydrogen result in localized hot spots. Conversely, in those areas where hydrogen concentration is low, complete combustion may not be possible. The net result is higher emissions, and in particular, higher NOx emissions, and often higher hydrocarbon than would be achieved if the hydrogen were more evenly distributed throughout the combustion chamber.

The present invention is directed to a method of operating an internal combustion engine under high charge dilution conditions using a hydrogen-rich fuel. The high charge dilution conditions are attained by diluting the hydrogen-rich fuel with gases such as excess air or recycled exhaust gas. The mixture to be charged to the combustion chamber is thoroughly mixed before it is introduced into the combustion chamber while the combustion chamber maintains a substantially quiescent state such that the charge mixture is introduced with an angular momentum lower than that of a typical low emission engine. The result is an internal combustion engine with both high efficiency and low emissions, particularly, low NOx emissions.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

The present invention is generally related to a method of operating an internal combustion engine that runs on a hydrogen-rich fuel for the purpose of producing near-zero NOx omissions. The engine is fueled with either hydrogen or a mixture of hydrogen and other hydrocarbons such as natural gas. The engine is operated at high levels of charge dilution which can be in the form of excess combustion air (lean-burn), exhaust gas recirculation (EGR), water injection, or combinations of these methods. The combined air-fuel mixture which comprises air, fuel and optionally, other diluents such as exhaust gas or water vapor is well mixed before entering the one or more combustion chambers. The intake system and combustion chamber or chambers are designed for reduced angular momentum of the air-fuel charge. By avoiding any angular momentum of the charge mixture, separation of the hydrogen from the other constituents is minimized, and a homogeneous air-fuel mixture is maintained.

Figure 1:
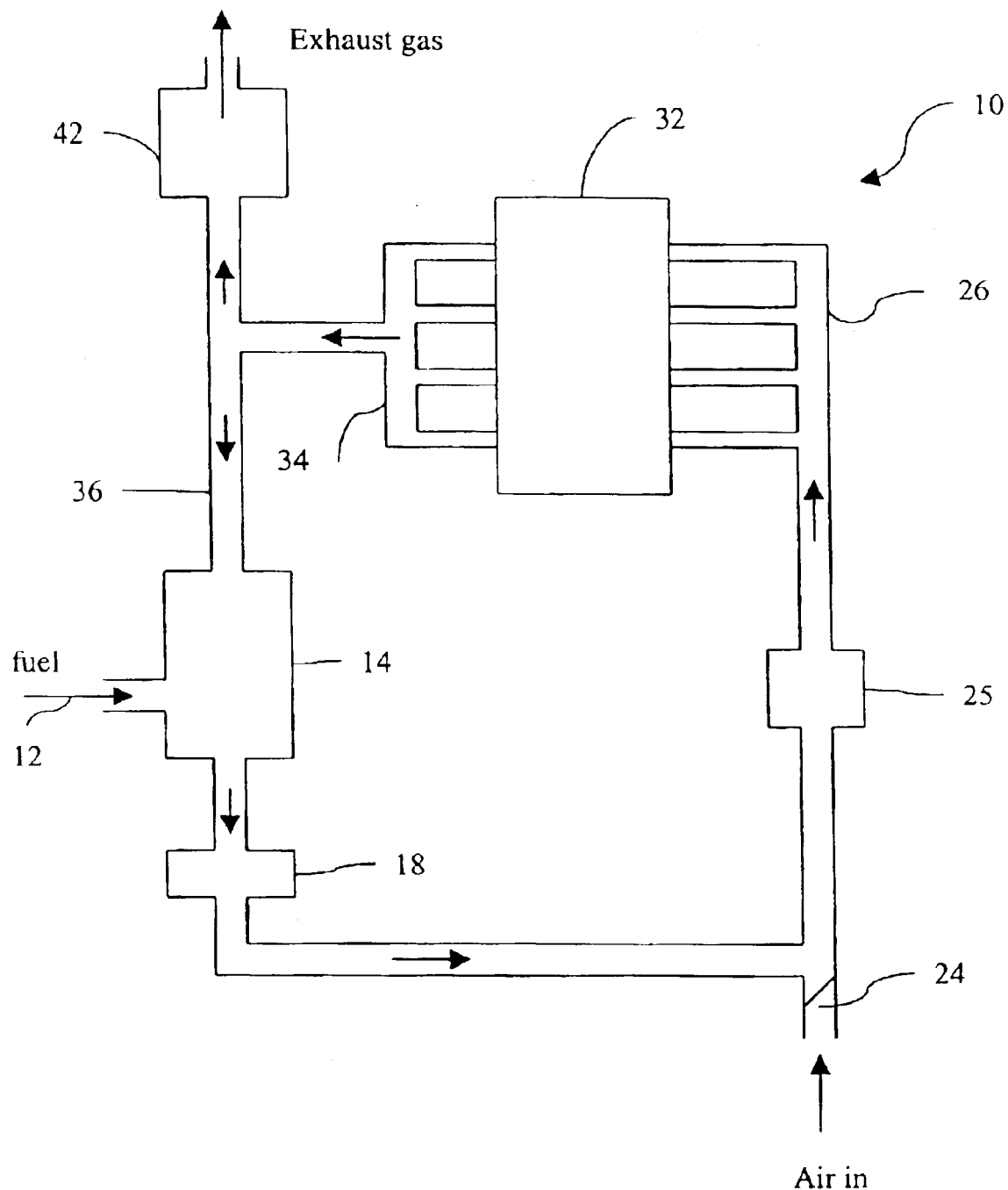
FIG. 1 is a schematic flow diagram illustrating an embodiment of the present invention.

FIG. 1 illustrates a first exemplary embodiment of an engine 10 implementing a preferred method of the present invention. In FIG. 1, a gaseous fuel, such as natural gas or propane gas, is introduced along fuel line 12 to a reforming reactor 14 where it combines with water vapor in the presence of heat and a catalyst to produce a fuel containing methane, hydrogen, carbon monoxide, diluted with other gases such as nitrogen, carbon dioxide and water vapor. In this embodiment, both water vapor and heat are provided by recycled exhaust gases from the internal combustion engine, as will be described in further detail below.

The fuel produced by the reactor is optionally cooled by a heat exchanger 18 in order to condense and remove at least a portion of any excess water vapor. If there is too much water vapor, it can condense in an internal combustion engine during the compression cycle. The cooled fuel then mixes with air which is introduced through a throttle 24. The combination of fuel and air then passes through a mixer 25 to blend the components to a homogeneous air-fuel mixture. The air-fuel mixture is then introduced through the intake manifold 26 and into the combustion chambers of an internal combustion engine 32. There, the air-fuel mixture is combusted to produce power and exhaust gases. Typically, the internal combustion engine is a reciprocating piston engine and for this embodiment, a four-cylinder internal combustion engine is illustrated which includes a combustion chamber associated with each cylinder.

Once the air fuel mixture has been combusted, the exhaust gases exit from the engine through an exhaust manifold 34. A portion of the exhaust gas stream is recycled to the reforming reactor via recycle line 36 to supply the water vapor and heat necessary to support the endothermic reforming reaction. The remaining exhaust is passed through an exhaust gas catalytic converter 42 and vented to atmosphere. The catalytic converter oxidizes the majority of any remaining unburned hydrocarbons or carbon monoxide to produce water vapor and carbon dioxide. Because the engine of the preferred embodiment generally operates under lean burn conditions with an excess amount of air, the exhaust gas stream should contain sufficient oxygen to support the oxidation reactions for the exhaust catalytic converter. However, if necessary, air can be injected as the source of oxygen. Because the NOx emissions are so low, there is generally no need for a NOx catalyst within the catalytic converter, but if even further reductions in NOx are desired, the catalytic converter can include a catalyst for reducing NOx.

Experiments were conducted to quantify the benefits of the engine operation of the present invention. The experiments compared the performance of four internal combustion engines exhibiting varying degrees of circular vortices in the charge mixture. Each of the engines was tested at 1800 rpm at a brake mean effective pressure (BMEP) of approximately 110 psi. The fuel consisted of a mixture of 30% hydrogen and 70% natural gas. The natural gas used consisted of 96.7% methane, 1.7% ethane, 0.7% nitrogen, and 0.5% carbon dioxide, with the remainder being primarily butane and higher order hydrocarbons. The engines were run at various air-to-fuel ratios to determine the maximum degree of charge dilution attainable for each engine. The fuel, air, and exhaust gas were mixed upstream of the intake manifold through a static mixer to achieve a substantially homogeneous mixture.

For each engine, the amount of angular momentum in the charge mixture was estimated by "swirl ratio" which is defined as the tangential velocity of the vortex flow within the cylinder bore at maximum valve opening divided by the axial velocity in the cylinder bore. Further information on swirl ratio can be found in Sections 8.3.1 and 8.3.2 of *Internal Combustion Engine Fundamentals*, by John B. Heywood, published by McGraw Hill, Inc., 1988, and Society of Automotive Engineers paper 810010, both of which are incorporated by reference.

The ignition timing was adjusted for minimum spark advance for maximum brake torque (MBT). The MBT was determined by operating the engine at three values of spark advance that "bracket" the point of maximum brake torque. A second-order curve-fit of the values of engine torque versus spark advance identified the value of spark advance that corresponded to the point of maximum engine torque as measured by an eddy-current dynamometer. The quantities of hydrocarbon and NOx emissions were measured by flame ionization and chemiluminescent detectors respectively. The engines were run on a diluted charge with excess air as illustrated by the measured amounts of oxygen present in the exhaust gas.

The spark advance is an important factor because at the high levels of charge dilution required to attain near-zero NOx emissions, the speed of the flame within the combustion chamber is substantially reduced such that the ignition timing must be significantly advanced to assure maximum power from the power stroke of the engine cycle. Consequently, for an air-fuel mixture that is not homogeneously mixed and where gases such as hydrogen tend to concentrate near the spark plug, the speed of the flame is significantly faster and significantly less spark advance is required. Consequently, for a well mixed charge mixture, a higher minimum spark advance for MBT will generally be observed. Due to the relationship between the homogeneity of the charge mixture and NOx emissions, the NOx emissions can also generally be correlated to the minimum spark advance for MBT.

EXAMPLE 1

Engine 1 is a four-cylinder Nissan NAPS-Z engine which includes an offset hemispherical "hemi" head combustion chamber and two spark plugs per cylinder and is characterized by a moderate swirl ratio of about 1.3. The engine, as described in the Society of Automotive Engineers Paper 810010, the disclosure of which is incorporated herein by reference, achieves high swirl through its cylinder head design and is able to run at relatively elevated levels of exhaust gas recirculation and resultant lower NOx emissions when operating on conventional hydrocarbon fuels. The performance of Engine 1 was determined by measuring the engine's MBT spark advance, and the hydrocarbon and NOx emissions.

Engine 1 emitted hydrocarbons at approximately 1507 parts-per-million (ppm) and NOx at approximately 29 ppm.

EXAMPLE 2

Engine 2 is a John Deere 8.1 liter, six-cylinder, inline, turbo-charged natural gas engine with a helical intake port designed to promote high swirl of the charge mixture. During these experiments, the performance of Engine 2 was determined by measuring the engine's MBT spark advance, and hydrocarbon and NOx emissions.

Engine 2 generated a very high swirl ratio estimated to be approximately 2.2, and emitted hydrocarbons at approximately 3050 ppm and NOx at approximately 148 ppm.

EXAMPLE 3

Engine 3 is a Ford 4.6 liter V-8 dual overhead cam modular engine. The engine includes a production cylinder head having a "shrouded" intake valve. The shroud of each intake valve protrudes into the combustion chamber to cause preferential flow through the intake valve away from the shroud. During these experiments, the performance of Engine 3 was determined by measuring the engine's MBT spark advance, hydrocarbon and NOx emissions.

Engine 3 generated a relatively moderate swirl ratio of approximately 1.1, and emitted hydrocarbons at approximately 1958 ppm and NOx at approximately 18 ppm.

EXAMPLE 4

Engine 4 is a is the same Ford modular engine as Engine 3, except that the cylinder head had been modified to reduce swirl. In particular, the valve shrouds were removed and the intake port was modified to direct the charge mixture into the combustion chamber at an angle generally perpendicular to the intake valve face.

Engine 4 exhibited instantaneous estimated swirl ratios between about 0 and 0.3 with unstable readings, reaching no apparent steady state. Hydrocarbons were emitted at a rate of approximately 634 ppm and NOx were emitted at a rate of approximately 11 ppm.

The results of the four engine experiments are summarized in Table 1 below.

TABLE 1

| Engine | Swirl Ratio | O₂ in Exhaust (%) | MBT Spark Advance (°BTDC) | HC Emissions (ppm) | NOx Emissions (ppm) |
|---|---|---|---|---|---|
| Engine 1 | 1.3 | 10.3 | 38 | 1507 | 29 |
| Engine 2 | 2.2 | 10.1 | 25 | 3050 | 148 |
| Engine 3 | 1.1 | 11.1 | 42 | 1958 | 18 |
| Engine 4 | 0.3 | 10.5 | 45 | 634 | 11 |

As illustrated by the results shown in Table 1, for a hydrogen-rich fuel such as that tested, as the swirl ratio increases, both the hydrocarbon and NOx emissions increase. Conversely, as the swirl ratio decreases, the hydrocarbon and NOx emissions decrease. Consequently, the lowest emissions are achieved by an engine in which the air-fuel mixture can be introduced into the combustion chambers under substantially quiescent conditions.

Specifically, the hydrocarbon and NOx emissions produced by Engine 1, an engine designed with moderate swirl, were lower than the emissions of Engine 2 by approximately 50% and approximately 80%, respectively. Similarly, for Engine 3, another moderate-swirl engine, the hydrocarbon emissions were over 35% lower and the NOx emissions were over 85% lower than high-swirl Engine 2. However, the best results were achieved by Engine 4, the engine designed to minimize swirl. The hydrocarbon emissions of Engine 4 were almost 80% lower than the hydrocarbon emissions of Engine 2, the high swirl engine, and over 65% lower than Engine 3, a moderate-swirl engine. The NOx emissions of Engine 4 were over 90% lower than those for high-swirl Engine 2, and over 35% lower than those for moderate-swirl Engine 3.

The MBT spark advance results further confirm the effectiveness of operating an engine at low swirl ratios. Engine 4, the engine designed to minimize swirl achieved maximum brake torque at 45 degrees of spark advance while Engine 2, the high-swirl engine, achieved maximum brake torque at only 25 degrees of spark advance. As explained above, the increase in spark advance for the low-swirl engine suggests a cooler combustion chamber in which the constituents of the air-fuel mixture are mixed better than an engine requiring less spark advance.

Figure 2:
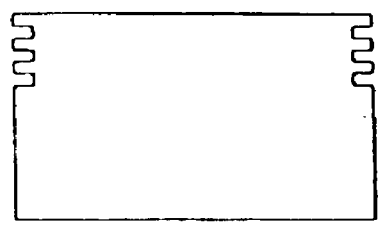
FIGS. 2A and 2B are side views of exemplary piston crown shapes useful in practicing methods of the present invention.
Figure 2:
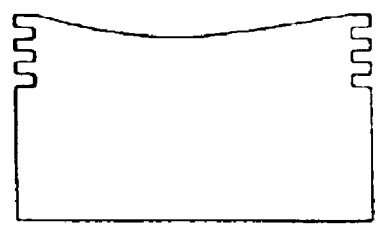

Examples of preferred piston crown shapes are shown in FIGS. 2A and 2B. The flat-top design, shown in FIG. 2A, and the dish design, shown in FIG. 2B, generally tend to avoid imparting any significant preferential motion within the charge mixture that would result in a net angular momentum of the charge mixture in the combustion chamber.

Figure 3:
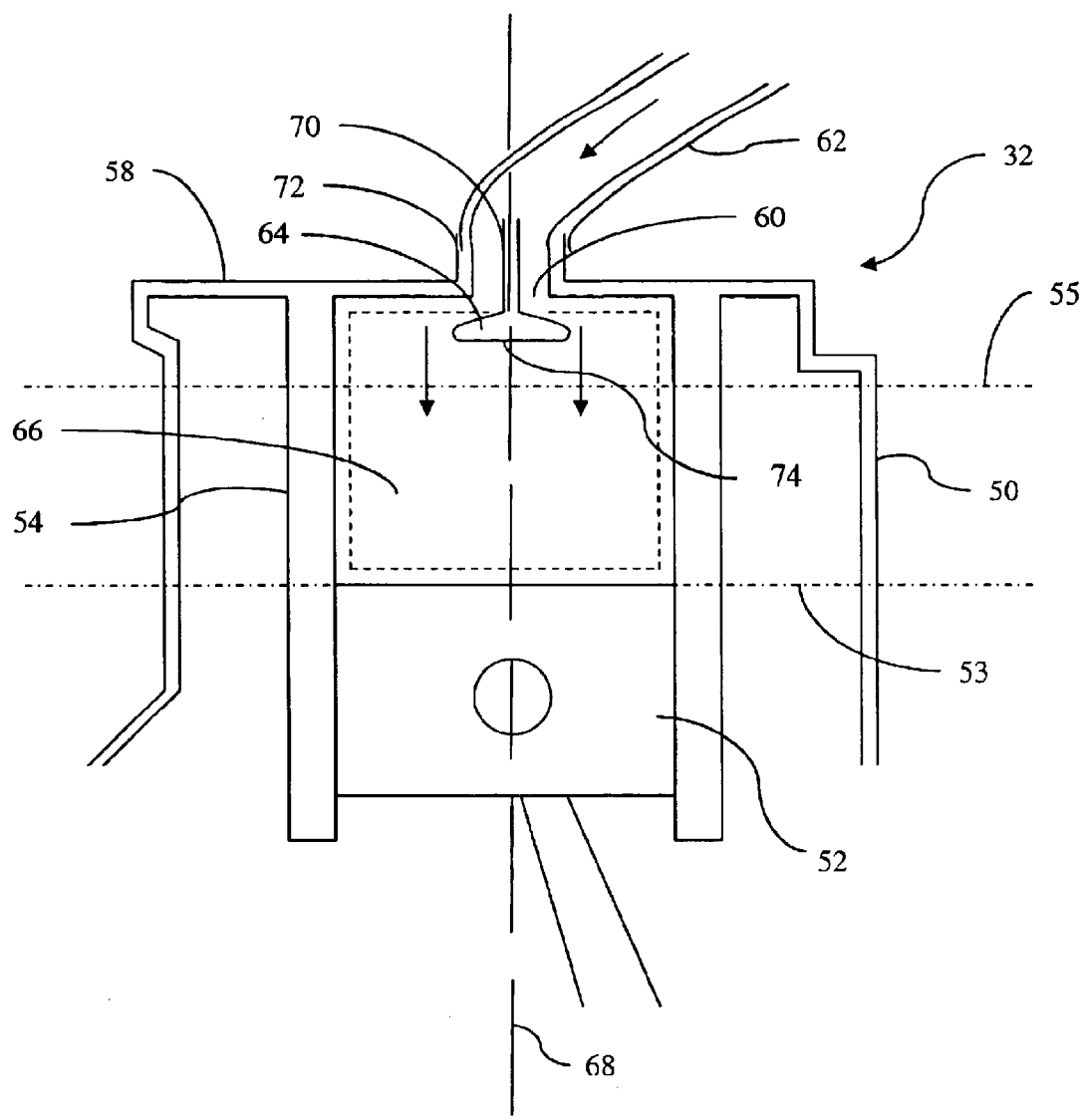
FIG. 3 is a side view in section of an embodiment of a piston cylinder of the present invention.

A preferred intake port and combustion chamber design is illustrated by FIG. 3. There, the engine 32 includes an engine block 50 that contains at least one piston 52 that reciprocally translates within a piston cylinder 54 between a first position 53, referred to as bottom dead center (BDC) and a second position 55, referred to as top dead center (TDC). The top of the cylinder is enclosed by a cylinder head 58, which includes an intake port 60 which passes the air-fuel mixture from the intake manifold 62 into the engine. An intake valve 64 is positioned at the intake port to regulate the air-fuel mixture passing from the intake manifold to the engine. Those skilled in the art would appreciate that internal combustion engines generally include both intake and exhaust valves, but only an intake valve is depicted in FIG. 3 to simplify the description of the exemplary engine. The top of the piston, the engine head and the annular interior wall of the cylinder define a combustion chamber 66 where the charge mixture is compressed and ignited. As illustrated by FIG. 3, the combustion chamber is preferably symmetrical about a longitudinal axis 68 extending though the center of the piston cylinder. To maintain a "quiescent" environment, the intake valves are not "shrouded", nor is there be any significant low clearance sections relative to the piston crown at TDC that could generate significant overall vortices in the combustion chamber.

The intake port is preferably designed such that the flow of the charge mixture passing into the combustion chamber is concentric and parallel to the cylinder walls and intake valve stem 70. To obtain charge flow parallel to the intake valve stem, the section of the intake port adjacent to the intake valve face preferably consists of port walls 72 parallel to the valve stem and perpendicular to valve face 74.

A small amount of valve cant relative to the cylinder centerline may be incorporated to allow clearance between the cylinder wall and the valve face such that the flow of the charge mixture is not significantly impeded by the cylinder wall. However, localized vortices are nearly impossible to avoid in conventional internal combustion engines. Thus, merely flowing charge mixture past a poppet intake valve will create localized vortices about the valve edges. The present invention eliminates large generalized vortices within the combustion zone of an internal combustion engine and specifies a design where the vector sum of unavoidable, small, and incidental vortices within the combustion chamber is near zero.

While the invention has been described mainly with respect to a hydrogen-rich fuel in which hydrogen is blended with natural gas, it will be understood that the invention has application to a pure hydrogen fuel as well as to a fuel containing a significant amount of hydrogen mixed with any other hydrocarbon fuel.

The present invention may be applied to any internal combustion engine, whether stationary or vehicular. It will also be understood that the invention can be applied to different types of internal combustion engines, including without limitation, reciprocating piston engines, Wankel engines and gas turbine engines. The engine may be single cylinder, multiple cylinder, or of combustor design, and may operate with or without regenerative heating of the combustor.

The engine may be naturally aspirated, or can use an external compression device such as a turbocharger or supercharger.

Having thus described an exemplary embodiment of the invention, it would be apparent to one of skill in the art that numerous other revisions could be made without deviating from the intended spirit and scope of the invention. Therefore, the invention is intended to be defined not by the specific features of the preferred embodiment as disclosed, but by the scope of the following claims.

What is claimed is:

1. A method of operating an internal combustion engine comprising:

providing a substantially homogeneous mixture comprising hydrogen and air;

introducing the mixture into a substantially quiescent combustion chamber of the internal combustion engine with a substantially low angular momentum such that the mixture is kept substantially homogeneous; and combusting the mixture within the combustion chamber.

2. The method of claim 1 wherein the mixture further comprises natural gas.

3. The method of claim 1 wherein the mixture further comprises a gas selected from the group consisting of methane, ethane, propane, butane and combinations thereof.

4. The method of claim 1 wherein the angular momentum of the mixture introduced into the combustion chamber has a swirl ratio less than about 1.

5. The method of claim 1 wherein the angular momentum of the mixture introduced into the combustion chamber has a swirl ratio of about 0.

6. The method of claim 1 wherein the air-fuel mixture further comprises excess air.

7. The method of claim 1 wherein the mixture further comprises a gas selected from the group consisting of exhaust gas, excess air, and combinations thereof.

8. A method of operating an internal combustion engine comprising:

providing a gaseous fuel comprising hydrogen;

mixing the gaseous fuel with air and a recycled exhaust gas stream to form an air-fuel mixture;

introducing the air-fuel mixture into a substantially quiescent combustion chamber of the internal combustion engine with a substantially low angular momentum such that the air-fuel mixture is kept substantially homogeneous;

combusting the air-fuel mixture within the combustion chamber to form an exhaust gas stream; and using a portion of the exhaust gas stream as the recycled exhaust gas.

9. The method of claim 8 wherein the air-fuel mixture further comprises natural gas.

10. The method of claim 8 wherein the air-fuel mixture further comprises a gas selected from the group consisting of methane, ethane, propane, butane and combinations thereof.

11. The method of claim 8 wherein the angular momentum of the air-fuel mixture introduced into the combustion chamber has a swirl ratio less than about 1.

12. The method of claim 8 wherein the angular momentum of the air-fuel mixture introduced into the combustion chamber has a swirl ratio of about 0.

13. The method of claim 8 wherein the air-fuel mixture further comprises excess air.

14. An internal combustion engine comprising:

a source of hydrogen as a fuel for the internal combustion engine;

a mixer adapted to homogeneously mix the fuel, air, and a recycled exhaust gas stream and produce an air-fuel mixture;

at least one combustion chamber adapted to receive the air-fuel mixture, burn the fuel, and produce an exhaust gas stream;

an intake manifold adapted to deliver the air-fuel mixture to the combustion chamber, wherein the intake manifold and combustion chamber maintain a substantially low angular momentum for the air-fuel mixture within the combustion chamber that the air-fuel mixture remains homogeneously mixed;

an exhaust gas line for removing exhaust gas stream from the combustion chamber and recycling at least a portion of the exhaust gas stream to the mixer as the recycled exhaust gas stream.

15. The engine of claim 14 wherein the engine includes at least one cylinder with a combustion chamber corresponding to each of the at least one cylinders.

16. The engine of claim 15 wherein each cylinder is defined by a cylinder wall and includes an intake port defines a flow path that is substantially concentric and parallel to the cylinder wall.

17. The engine of claim 15 further comprising an intake valve corresponding to each cylinder, each intake valve including a valve stem, wherein each intake port is defined by at least one port wall substantially parallel to the corresponding valve stem.

18. The engine of claim 15 further comprising a piston associated with each cylinder, wherein each piston defines a flat piston crown.

19. The engine of claim 15 further comprising a piston associated with each cylinder, wherein each piston defines a dished piston crown.

20. The engine of claim 19 wherein each piston crown is substantially symmetrical about a central axis of the corresponding cylinder.

* * * * *